(12) United States Patent
Adrangi et al.

(10) Patent No.: US 7,779,243 B2
(45) Date of Patent: Aug. 17, 2010

(54) DUAL OPERATING SYSTEM COMPUTING SYSTEM

(75) Inventors: Farid Adrangi, Lake Oswego, OR (US); Hani Elgebaly, Beaverton, OR (US); Krishnan Rajamani, San Diego, CA (US); Vijay Rao, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 812 days.

(21) Appl. No.: 11/618,397

(22) Filed: Dec. 29, 2006

(65) Prior Publication Data

US 2008/0162914 A1    Jul. 3, 2008

(51) Int. Cl.
*G06F 9/24* (2006.01)

(52) U.S. Cl. .............................. 713/2; 713/1; 713/100

(58) Field of Classification Search ............... 713/1, 713/2, 100, 300, 320
See application file for complete search history.

(56) References Cited

U.S. PATENT DOCUMENTS

| | | | |
|---|---|---|---|
| 6,668,318 B1* | 12/2003 | Jenkins et al. ............ | 713/1 |
| 2002/0085835 A1* | 7/2002 | Zhang et al. .............. | 386/124 |
| 2003/0163601 A1* | 8/2003 | Cupps et al. .............. | 709/319 |
| 2003/0188144 A1* | 10/2003 | Du et al. ................... | 713/1 |
| 2005/0278559 A1* | 12/2005 | Sutardja et al. ........... | 713/320 |
| 2006/0149956 A1* | 7/2006 | Chang ...................... | 713/1 |
| 2007/0067655 A1* | 3/2007 | Shuster .................... | 713/300 |

* cited by examiner

*Primary Examiner*—Thomas Lee
*Assistant Examiner*—Paul B Yanchus, III
(74) *Attorney, Agent, or Firm*—Schwabe, Williamson & Wyatt, P.C.

(57) ABSTRACT

A computer system, method, article of manufacture, and system is provided comprising a processor, a first storage device with a primary operating system stored within and a second storage device with a secondary operating system stored within. The computer system contains BIOS capable of booting either the primary operating system or the secondary operating system responsive to user selection. The secondary operating system has fewer functions than the primary operating system and is capable of running the computer system independent of the primary operating system.

30 Claims, 3 Drawing Sheets

DUAL OPERATING SYSTEM COMPUTING SYSTEM

TECHNICAL FIELD

Embodiments relate to the field of computing systems, in particular, to methods and apparatuses for operating a secondary operating system, in addition to a primary operating system, on a computing system to provide a reliable, instantly available, and low power operational mode for substantially instant access to communications tools.

BACKGROUND

Computer users increasingly rely on communication tools provided on their desktop, laptop/notebook, or ultra-mobile personal computer to communicate for both personal and business reasons. These communication tools include electronic mail, web browsing, instant messaging and collaboration tools, Voice over Internet Protocol (VoIP) technologies, etc. Also, wireless connectivity options allow users of mobile computers to access communication and collaboration tools wherever they may be located. Standard computing systems typically run on LINUX, the Windows operating systems from Microsoft Corporation, the Mac OS line of operating systems, and others. These operating systems have become increasingly complex. As a result, these operating systems take a long time to boot, are not always secure, and due to their open nature are typically vulnerable to viruses, Trojan horses, malware, and software bugs making them less reliable. Mobile and other computer users may find these limitations inconvenient or worse as they continue to rely on their computer systems for communication. Also, wireless service providers may be reluctant to deploy charged services on computing systems employing open operating systems for these same reasons.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, a computer system with a primary operating system on a first storage medium and a secondary operating system on a second storage medium where the secondary operating system has less functions than the secondary operating system and the system has a BIOS capable of loading either operating system. Embodiments also include methods for utilizing the secondary operating system to repair the primary operating system.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
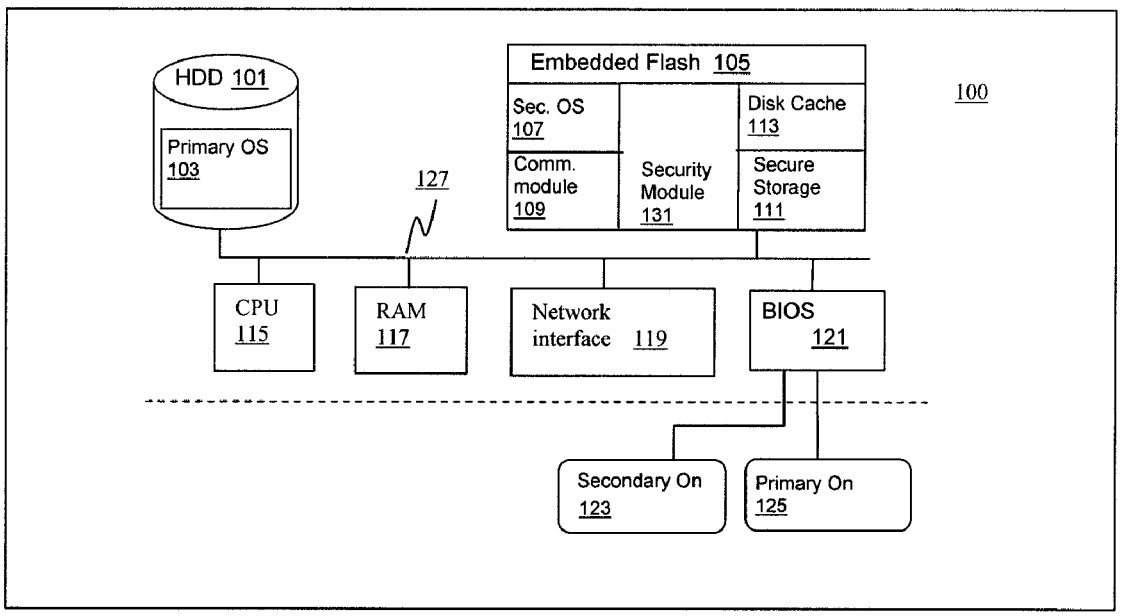
FIG. 1 shows a computer system with a secondary operating system incorporated with the teachings of the invention, in accordance with various embodiments.

FIG. 1 illustrates computer system 100 with secondary operating system (OS) 107 loaded on embedded flash 105 in accordance with various embodiments of the present invention. Hard disk drive (HDD) 101 with primary operating system (OS) 103 loaded therein may be attached to motherboard 127. In embodiments, primary operating system 103 may be a Linux operating system, a Unix operating system, an operating system from the Microsoft Windows line of operating systems including Windows 95, Windows 98, Windows 98 Second Edition, Windows ME, Windows 2000, Windows Server 2003, Windows Fundamentals, Windows XP, Windows NT 3.1, Windows NT 3.5, Windows NT 3.51, Windows NT 4.0, Windows Vista, as well as other Windows operating systems. In embodiments, primary operating system 103 may be one from the Mac OS X suite of operating systems or MAC OS 7, OS 8, OS 9, etc. Those of ordinary skill in the art will recognize that many different operating systems may be used as the primary operating system. In embodiments, primary operating system 103 may be an open operating system allowing users and/or administrators to install or uninstall new software modules.

In alternative embodiments, primary OS 103 may be stored on a mass-storage device other than a hard disk drive.

Embedded flash 105 may include communication module 109, secure storage 111, and disk cache 113. In embodiments, flash 105 may contain security module 131. In embodiments, flash 105 may be Robson flash. In embodiments, other types of flash memory may be utilized. Embodiments of the present invention are not limited by any one type of flash memory. Alternative embodiments of the present invention may replace flash 105 with other suitable storage devices that provide reliability and quick loading. In other embodiments, secondary OS 107 may be loaded onto a hard disk drive.

In embodiments, secondary OS 107 may be a closed operating system. In embodiments, secondary OS 107 may not have as many features as primary OS 103. In embodiments, it may be "stripped down" to provide only the basics of an operating system that allow computer system 100 to communicate via a communications network, run communication module 109. A portion of embedded flash 105 may be dedicated to storing secondary OS 107, its applications, and data in a write-protected format. Thus, secondary OS 107 and all constituent data, software modules, and configurations, etc may be protected and isolated from primary OS 103. Therefore, secondary OS 107 may be protected from any malicious software, viruses, Trojan horses, or other malware that may be loaded onto, or that may be targeted towards, primary OS 103.

Communications module 109 may include various communications and personal productivity applications such as a Voice over Internet Protocol (VoIP) module, an electronic mail (email) module, instant messaging (IM) module, a web-browser module, collaboration applications, a scheduler, a calendar module, an application to draft and store notes, game modules, an application to store contact information, multimedia communication applications such as video conferencing, etc. A portion of embedded flash 105 may be dedicated to storing communications module 109 and its files and various software applications. By being stored in flash 105, reliable access to communication module 109 may be achieved by isolating it from HDD 101 and primary OS 103 which may be not as reliable as flash 105 and secondary OS 107. In embodiments, communication module 109 may be a communication software stack. In embodiments, communication module 109 may include a communication protocol stack such as the Transport Control Protocol/Internet Protocol (TCP/IP) suite of protocols. Other examples include Internet Packet Exchange (IPX), Internet Protocol version 6, etc. Those of ordinary skill in the art will recognize that embodiments of the present invention are not limited to any particular communications protocol stacks.

In embodiments, secure communications may be achieved by isolating all contents of flash 105, including secondary OS 107 and communications module 109, from primary OS 103. Primary OS 103 may not have direct access to either secondary OS 107 or communication module 109 to install programs, make upgrades, etc. Thus, web browsing using communication module 109 may be secured by executing a web browser in an isolated environment and by providing it with secure access to encryption keys and credentials stored within flash 105. Thus, a secured browsing environment may be provided for on-line banking, online business-to-business commerce, online business-to-consumer commerce, online shopping, and other web browsing implementations where security and/or fraud concerns exist.

In embodiments, communications module 109 may include a wireless service provider's standard communication tools, capabilities, and interfaces such as those that reside on cellular telephones, PCS phones, personal data assistants (PDA), etc. for use with the wireless service provider's network. In this way, computer system 100, in conjunction with communications module 109 residing on secondary OS 107, may emulate the communications tools, services, and interfaces that users are accustomed to using on their cellular phones, PCS phones, and PDAs. Thus, a user may interact with computer system 100 just as if computer system 100 were a PCS phone, cellular phone, PDA, etc. communicating with the wireless service provider's network. In embodiments, communications module 109 may include non-standard communication tools, interfaces, and capabilities for use in communicating via the wireless carrier's network. In embodiments, these standard or non-standard tools may be provided by a wireless service provider but may be capable of utilizing any networking interface that resides on computer system 100.

In embodiments, the contents of flash 105 including secondary OS 107, communications module 109, security module 131, and all files stored on flash 105 may be maintained by an organization's information technology department rather than by a user. In embodiments, a service provider such as for example, a wireless service provider, may maintain the contents of flash 105 such as secondary OS 107, communications module 109, security module 131, disk cache 113, and secure storage 111, etc.

Also attached to motherboard 127 may be central processing unit (CPU) 115, random access memory (RAM) 117, networking interface 119, and basic input/output system (BIOS) 121. In embodiments, networking interface 119 may be a wired LAN connection such as those based on Ethernet, any of the various IEEE 802.3 standards, token ring, FDDI, Arcnet, asynchronous transfer mode (ATM), etc. In embodiments, networking interface 119 may be a wireless LAN (WLAN) based on, for example, the various IEEE 802.11 standards or other standards-based or proprietary wireless protocols. In embodiments, networking interface 119 may be based on a Wireless Wide-Area network (WWAN) such as cellular, packet switched, circuit switched wireless protocols, 3G (third generation) wireless standards, etc. In embodiments, networking interface 119 may be a Worldwide Interoperability for Microwave Access (WiMAX) device. In embodiments, networking interface 119 may be a Bluetooth or IEEE 802.15 wireless specification. In embodiments, networking interface 119 may be a modem. Those of ordinary skill in the art will recognize that embodiments of the invention are not limited by the type of networking interface used in computer system 100.

Security module 131 may include any of a firewall module, Virtual Private Networking (VPN) module, anti-virus module, anti-spyware module, anti-malware, etc. The VPN module may support any of various virtual private networking protocols and/or standards that are known in the art. Secure storage 111 may provide a secure location to store encryption keys for implementing security module 131 including a VPN module. In embodiments, computer system 100 may include a security processor (not shown) coupled to flash 105 and adapted to implement various encryption/decryption functions in security module 131. In embodiments, the security processor may implement various other security functions of security module 131 or of communications module 109, secondary operating system 107, etc. In embodiments, the security processor and flash 105 may be tamper resistant to improve the overall level of security.

In embodiments, computer system 100 may also include secondary on button 123 and primary on button 125. In embodiments, buttons 123 and 125 may be on a keyboard panel of a mobile computer. In embodiments, buttons 123 and 125 may be located on a mobile computer somewhere other than the keyboard panel. In embodiments, buttons 123 and 125 may be located on the outside of a desktop computer case. Buttons 123 and 125 may be located any place on, inside, or in proximity to, a computer system accessible to a user for actuation. A user actuating secondary on button may power-up computer system 100 and cause BIOS 121 to load secondary OS 107 stored in flash memory 105. A user actuating primary on button 125 may power up computer system 100 and cause BIOS 121 to load primary OS 103. When primary OS 103 is booted, it may control all system resources including networking interface 119, CPU 115, and RAM 117 as well as any other hardware, peripheral, or input/output devices that may be attached to computer system 100 such as monitors, keyboards, a pointer device, retinal scanner, game control device, etc. In embodiments, primary OS 103 may operate only a subset of all devices attached to computer system 100. In embodiments, BIOS 121 may be programmed to not allow primary OS 103 to boot when secondary OS 107 is already booted and vice versa.

In other embodiments, a single "on" button may be provided and BIOS 121 may display a selectable menu to facilitate a user of computer system 100 in choosing which operating system to boot. Thus, pushing the single "on" button may cause computer system 100 to power up and an area of a display screen may then display a menu with secondary OS 107 and primary OS 103 as options. The user may then select one or the other using a mouse, keyboard or other means. Upon selection, BIOS 121 may then boot up the selected operating system.

When secondary OS 107 is booted, it may control all computer resources, hardware devices, peripherals, and input/output devices that may be attached to computer system 100 including CPU 115, RAM 117, networking interface 119, etc. In embodiments, secondary OS 107 may control only a subset of all such devices. Thus, secondary OS 107 may not require a virtualization scheme to run in conjunction with primary OS 103 such as, for example, Intel's VT COMM partition. Also, secondary OS 107 may not require a second processor to perform its functions. Secondary OS 107 may not require primary OS 103 to be loaded on computer system 100 in order to function. Secondary OS 107 may be capable of running on computer system 100 even if primary OS 103 is removed or inoperable. Additionally secondary OS 107 may run on existing chipset and processor designs. It may have full access to system devices. In embodiments, primary OS 103 and secondary OS 107 may not be allowed to run concurrently; thus system resources may not be shared concurrently between the two operating systems.

Thus, selection of either secondary on button 123 or primary on button 125 (or the selection made in a selectable menu displayed by BIOS 121) determines the "personality" of the computer system by either loading secondary OS 107 or primary OS 103. When secondary OS 107 is booted, a user may have access to instantly-available, reliable, secure communications programs. The use of a small-scale operating system such as secondary OS 107 and flash 105 may allow secondary OS 107 to boot much more quickly when selected. Thus, a user of computer system 100 may have nearly-instant access to his communication tools. Also, the independence of secondary OS 107 from primary OS 103 may provide a service provider, such as a third party service provider or a wireless service provider, a platform on which to develop or use a preferred operating system, preferred communications tools, preferred security infrastructure, etc. that do not rely on, and/or are independent from, the requirements and availability of primary OS 103.

When primary OS 103 is selected, the user may have access to the full panoply of software applications and operating system functions included within primary OS 103 which may or may not include communication applications similar to those in communication module 109.

In embodiments, BIOS 121 may set an operating clock rate for CPU 115 upon loading secondary OS 107 that is slower than the operating clock rate it may set for CPU 115 upon loading primary OS 103. In embodiments, BIOS 121 may set the same operating clock rate upon booting either operating system. In embodiments, BIOS 121 may set a faster operating clock rate when booting secondary OS 107 than when booting primary OS 103.

In embodiments, computer system 100 may conserve power when secondary OS 107 is booted. As noted above, BIOS 121 may set a slower operating clock rate on CPU 115 when running secondary OS 107. Also, BIOS 121 may facilitate lowered power consumption by activating only a subset of all available hardware devices, peripherals, and input/output devices on computer system 100 when running secondary OS 107. For example, BIOS 121 may not activate HDD 101 thereby lowering power consumption. BIOS 121 may activate only a fraction of available RAM thereby lowering power consumption. In embodiments, inline codec execution may be performed in flash 105 thereby eliminating the need to activate the RAM. Additionally, BIOS 121 may activate only a small portion of a display monitor (not shown) when running secondary OS 107 thereby conserving power. In embodiments, BIOS 121 may set a hardware configuration upon user selection of secondary OS 107 designed to lower power consumption by selectively activating a subset of a chipsets on computer system 100 using a chipset I/O controller, a chipset graphics controller, and/or a memory controller. In embodiments, this may be accomplished by utilizing a control application-specific integrated circuit (ASIC). In embodiments, BIOS 121, upon user selection of secondary OS 107, may activate a low power graphic card which may be different from, and consume less power than, a graphic card that may be enabled when primary OS 103 is selected. In embodiments, network interface 119 may be power managed to conserve power. Power management may include, for example, causing network interface 119 to sleep between packets.

By taking these measures, computer system 100 may conserve power, including battery-supplied power, when secondary OS 107 is running. In embodiments, it may or may not consume less power than is consumed when primary OS 103 is running.

Figure 2:
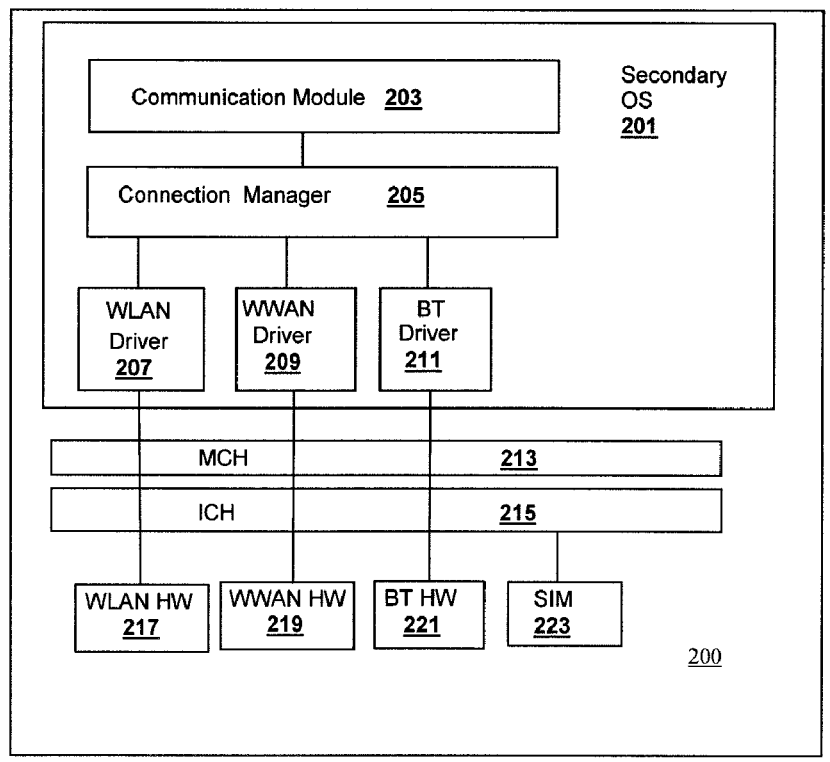
FIG. 2 shows the interaction between a secondary operating system and computer system hardware components in accordance with various embodiments of the present invention.

FIG. 2 shows the interaction between secondary operating system 201 and hardware components within computer system 200 in accordance with various embodiments of the present invention. Secondary OS 201 may contain communication module 203, connection manager 205. Secondary OS 201 may contain WLAN driver 207, WWAN driver 209, and/or Bluetooth driver 211. Computer system 200 may contain WLAN hardware 217, WWAN hardware 219, and/or Bluetooth hardware 221. Computer system 200 may also contain memory controller hub (MCH) 213 and I/O controller hub (ICH) 215. MCH 213 and ICH 215 may facilitate communication between WLAN HW 217 and WLAN driver 207; between WWAN HW 219 and WWAN driver 209, and/or between Bluetooth HW 221 and Bluetooth driver 211. In embodiments, computer system 200 may have networking interface devices and corresponding drivers other than those listed above, including all manner of wired LAN interface devices.

Computer system 200 may also contain Subscriber Identity Module (SIM) 223 or similar device used for storing wireless communication service subscriber information, stored contacts information, text messages, etc. In embodiments, SIM 223 may contain only subscriber information. Connection manager 205 may contain a Wake On VoIP module that may be capable of waking up secondary OS 201 and communication module 203 upon receipt of a VoIP telephony call. Allowing the computer system to go into sleep mode to be woken up in the event of a VoIP call may allow for improved battery life and/or reduced power consumption between calls. Connection manager 205 may also facilitate the establishment, maintenance, and/or termination of one or more communication sessions.

In embodiments, SIM 223 may contain a separate Central Processing Unit (CPU), Read Only Memory (ROM), Random Access Memory (RAM), and/or Electronically Erasable Programmable Read-Only Memory (EEPROM) for storage and input/output functions. The separate CPU of SIM 223 may be adapted to execute security algorithms required to run the security features of secondary OS 201 at least partially within hardware rather than relying on software. SIM 223 may also store all encryption keys and other security credentials needed for the security algorithms. In embodiments, stored encryption keys may be used to authenticate to a wireless or other service provider's network. SIM 223 may be a tamper resistant environment which cannot be broken into. In embodiments, BIOS of computer system 200 may activate SIM 223 upon user selection of secondary OS 201.

Figure 3:
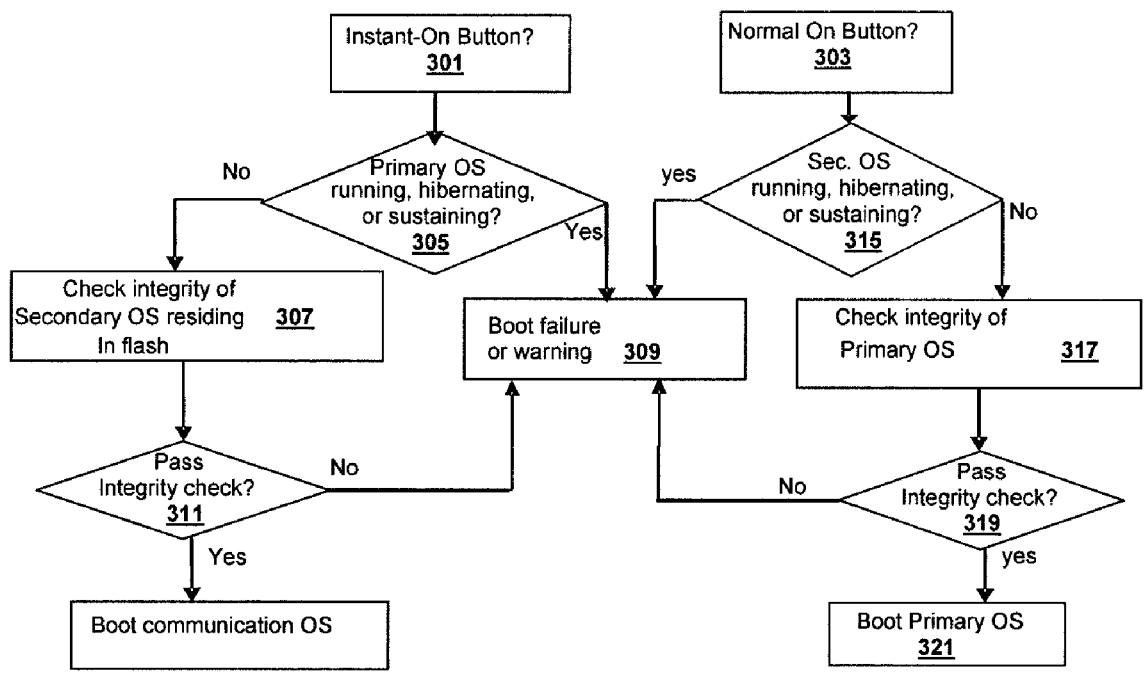
FIG. 3 shows a flow chart view of selected operations of the methods of various embodiments of the present invention in which either a primary or a secondary operating system is booted on a computer system.

FIG. 3 shows a method for facilitating a user in selection of an operating system to boot. If the secondary on button is selected by a user in 301, the computer system BIOS may load and determine, in 305 whether the primary operating system is running, hibernating, or sustaining. If it is, then the BIOS may fail to boot the secondary operating system and/or display a warning message to the user in 309. The warning message may also direct the user to shut down, hibernate, or suspend the currently running, hibernating, or sustaining operating system before retrying. In embodiments, the warning message may present a selectable menu giving the user the option of shutting down, hibernating, or suspending the currently-running operating system. If the primary operating system is not currently running, hibernating, or sustaining, then the BIOS may check the integrity of the secondary operating system stored on the computer system in 307. If the secondary operating system passes the integrity check in 311, the BIOS may boot the secondary operating system in 313. If it fails, BIOS may go back to 309 and display a warning and/or fail to boot the secondary operating system.

If the user selects the primary on button in 303 in order to boot the primary operating system, the BIOS of the computer system may load and check to see if the secondary operating system is running, hibernating, or sustaining in 315. If it is, the BIOS may display a warning and/or fail to boot the primary operating system in 309. If it is not, the BIOS may run an integrity check on the primary operating system stored within the computer system in 317. If it passes integrity check in 319, then the BIOS may boot the primary operating system in 321; if it does not, the BIOS may display a warning and/or fail to boot primary operating system in 309.

In embodiments, both the secondary on button and the primary on button may be replaced by a single button. In that case, the BIOS may display a selectable menu which may give the user an option to boot either the primary OS or the secondary OS.

In alternate embodiments, the BIOS of the computer system may suspend the primary OS if the user selects the secondary OS. In this case, the HDD may shut down temporarily while the secondary OS is running. In embodiments, the HDD may shut down within five seconds. In embodiments, the HDD may take longer than five seconds to shut down. Unused network devices may also shut down when the user selects the secondary OS while the primary OS is running.

Figure 4:
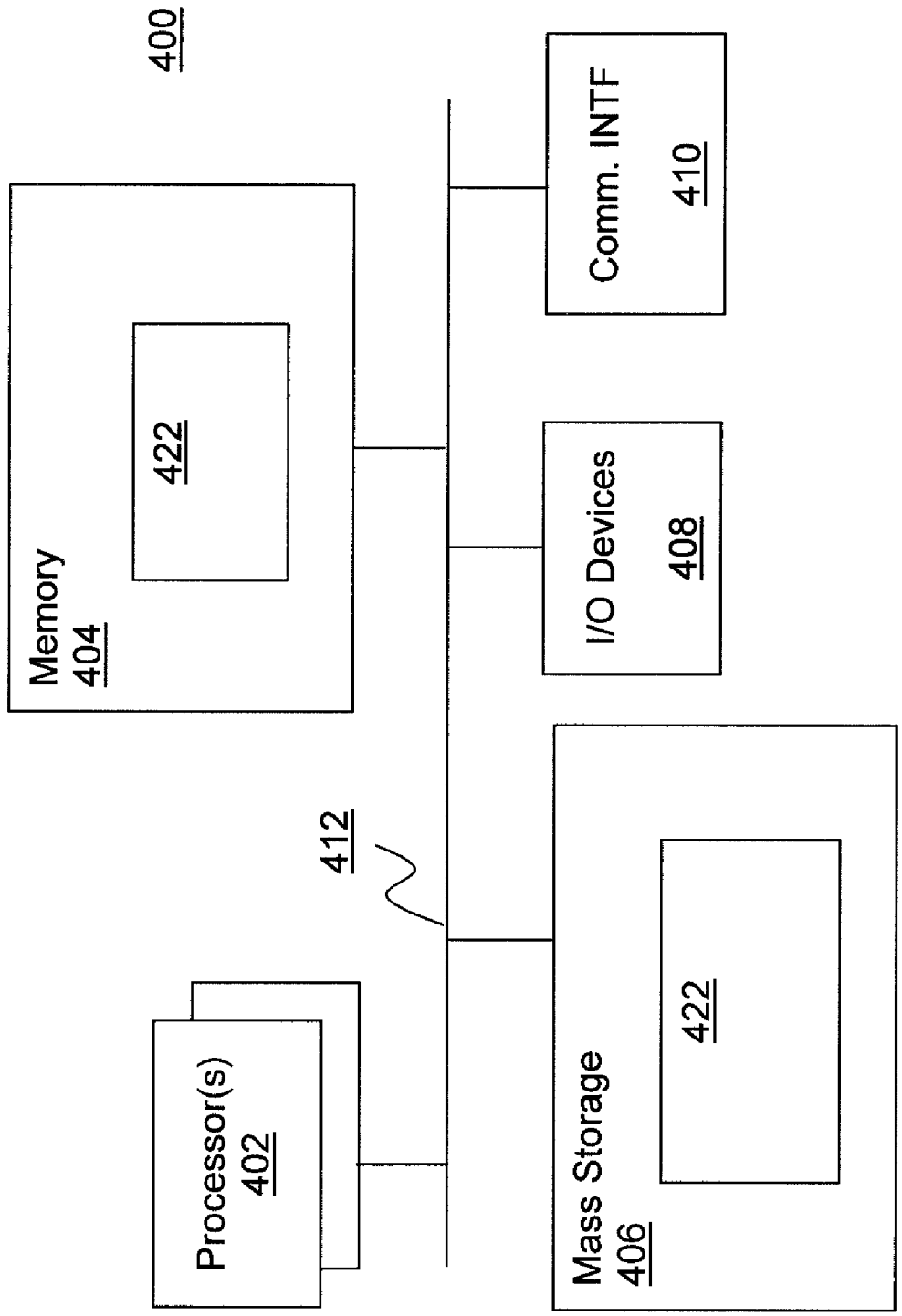
FIG. 4 illustrates an example computer system suitable for use to practice various embodiments of the present invention.

FIG. 4 illustrates an example computer system suitable for use to practice various embodiments of the present invention. As shown, computing system 400 includes a number of processors or processor cores 402, and system memory 404. For the purpose of this application, including the claims, the terms "processor" and "processor cores" may be considered synonymous, unless the context clearly requires otherwise. Additionally, computing system 400 includes mass storage devices 406 (such as diskette, hard drive, compact disc read only memory (CDROM) and so forth), input/output devices 408 (such as keyboard, cursor control and so forth) and communication interfaces 410 (such as network interface cards, modems and so forth). The elements are coupled to each other via system bus 412, which represents one or more buses. In the case of multiple buses, they are bridged by one or more bus bridges (not shown).

Each of these elements performs its conventional functions known in the art. In particular, system memory 404 and mass storage 406 may be employed to store a working copy and a permanent copy of the programming instructions implementing one or more of the various components, such as the secondary operating system, communications module, security module and so forth, herein collectively denoted as 422. The various components may be implemented by assembler instructions supported by processor(s) 402 or high-level languages, such as C, that can be compiled into such instructions.

The permanent copy of the programming instructions may be placed into permanent storage 406 in the factory, or in the field, through, for example, a distribution medium (not shown), such as a compact disc (CD), or through communication interface 410 (from a distribution server (not shown)). That is, one or more distribution media having an implementation of the agent program may be employed to distribute the agent and program various computing devices.

The constitution of these elements 402-412 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A computer system comprising:
   a processor;
   a first storage device coupled to the processor, and having stored within a first plurality of programming instructions designed to implement a primary operating system;
   a second storage device coupled to the processor, and having stored within a second plurality of programming instructions designed to implement a secondary operating system capable of operating the computer system independent of the primary operating system, the secondary operating system having less functions than the primary operating system; and
   a BIOS module operated by the processor, wherein the BIOS module is configured to
   receive a user selection of either the secondary operating system or the primary operating system;
   determine, when the selection indicates the secondary operating system, whether the primary operating system is running or hibernating;
   determine, when the selection indicates the primary operating system, whether the secondary operating system is running or hibernating; and
   conditionally load, responsive to the user selection, either the secondary operating system if the primary operating system is not running or hibernating, or the primary operating system if the secondary operating system is not running or hibernating.

2. The computer system of claim 1 wherein the second storage device is embedded flash memory.

3. The computer system of claim 1 wherein the secondary operating system is write-protected from the primary operating system.

4. The computer system of claim 1 wherein the BIOS is further configured to set a first operating clock rate for the processor responsive to the user selection of the secondary operating system and to set a second operating clock rate for the processor responsive to the user selection of the primary operating system, wherein the second clock rate is faster than the first clock rate.

5. The computer system of claim 1 wherein the BIOS is further configured to activate, responsive to the user selection of the secondary operating system, a first set of the computer system's hardware components, and activate a second set of the computer system's hardware components responsive to the user selection of the primary operating system, wherein the first and second sets differ by at least one hardware component.

6. The computer system of claim 5 wherein the first set includes a secondary graphics card and the second set includes a primary graphics card, the secondary graphics card adapted to consume less power than the primary graphics card.

7. The computer system of claim 5 wherein the first set includes a Subscriber Identity Module.

8. The computer system of claim 1 wherein the BIOS is further configured to activate a subset of available memory of the computer system responsive to the user selection of the secondary operating system.

9. The computer system of claim 1 wherein the BIOS is further configured to activate only a fraction of a display area in a display screen of the computer system responsive to the user selection of the secondary operating system.

10. The computer system of claim 1 further comprising a networking interface coupled to the processor.

11. The computer system of claim 10 wherein the secondary operating system further comprises a communication module adapted to facilitate communications between the computer system and a remote device via the networking interface.

12. The computer system of claim 11 wherein the secondary operating system further comprises a selected one of a telephony module, an instant messaging module, an electronic mail module, a virtual private networking module, a firewall module, or a web browser module.

13. The computer system of claim 10 wherein the networking interface is a selected one of a wired network device, a wireless local area network device, a wireless wide area network device, a wireless metropolitan area network device, and a Bluetooth wireless device.

14. The computer system of claim 1 further comprising a first mechanical button for user selection corresponding to the primary operating system and a second mechanical button for user selection corresponding to the secondary operating system, the first and second mechanical buttons configured to, responsive to the actuation of a selected one of the first and second mechanical buttons by a user, cause the computer system to power on and the BIOS to receive the user selection for a load of the operating system associated with the actuated button.

15. The computer system of claim 1 wherein the BIOS is designed to display a screen upon loading, said screen including a selectable menu including a first selection to launch the first operating system and a second selection to launch the second operating system, the selection of one of the first and second operating systems causing the BIOS to receive the user selection for a load of the selected operating system.

16. The computer system of claim 14 wherein the secondary operating system having less functions than the primary operating system comprises a voice over internet protocol (VoIP) module, and wherein the BIOS is configured to perform the determination to determine whether the primary operating system is running or hibernating, after user actuation of the second mechanical button and prior to the load of the secondary operating system associated with the actuated button.

17. The computer system of claim 14 wherein the secondary operating system having less functions than the primary operating system comprises a voice over internet protocol (VoIP) module, and wherein the BIOS is configured to perform the determination to determine whether the secondary operating system is running or hibernating, after user actuation of the first mechanical button, and prior to the load of the primary operating system associated with the actuated button.

18. A method comprising:
  facilitating a user of a computer system in selecting between a primary operating system stored as a plurality of programming instructions on a permanent storage device of the computer system and a secondary operating system stored as a plurality of programming instructions in an embedded flash module of the computer system, said secondary operating system capable of running the computer system independent of the primary operating system, said secondary operating system having less features than the primary operating system;
  determining, by a BIOS of the computer system, when the selection indicates the secondary operating system, whether the primary operating system is running or hibernating, and determining, by the BIOS, when the selection indicates the primary operating system, whether the secondary operating system is running or hibernating;
  conditionally loading, by the BIOS, responsive to the user selection, either the secondary operating system if the primary operating system is not running or hibernating, or the primary operating system if the secondary operating system is not running or hibernating; and
  implementing, by the BIOS of the computer system, a first hardware configuration of the computer system upon loading of the primary operating system, and a second hardware configuration of the computer system upon loading the secondary operating system, the first and second hardware configurations differing by at least one hardware setting.

19. The method of claim 18 wherein the first hardware configuration includes a setting to activate first set of hardware components of the computer system, the second hardware configuration includes a setting to activate a second set of hardware components of the computer system, the first and second set of hardware components differing by at least one hardware component.

20. The method of claim 18 wherein the first hardware configuration includes a setting to set a first operating clock rate for a central processing unit of the computer system, and the second hardware configuration includes a setting to set a second operating clock rate for the central processing unit, the second operating clock rate slower than the first operating clock rate.

21. The method of claim 18 wherein the first hardware configuration includes a setting to activate a first area of a display screen of the computer system, the second hardware configuration includes a setting to activate a second area of the display screen, the second area smaller than the first area.

22. The method of claim 18 wherein the first hardware configuration includes a setting to activate a first percentage of Random Access Memory of the computer system, the second hardware configuration includes a setting to activate a second percentage of the Random Access Memory, the second percentage smaller than the first percentage.

23. The method of claim 18 further comprising running, by the computer system upon loading of the secondary operating system, a communications module stored as a plurality of instructions on the embedded flash module, the communications module adapted to facilitate communications between the computer system and a remote device.

24. The method of claim 18 wherein the secondary operating system is write protected from the primary operating system.

25. A system comprising:
a processor;
an optical media drive coupled to the processor;
a mass storage device coupled to the processor, and having stored within a first plurality of programming instructions designed to implement a primary operating system;
a flash memory device coupled to the processor, and having stored within a second plurality of programming instructions designed to implement a secondary operating system capable of operating the computer system independent of the primary operating system, the secondary operating system having less functions than the primary operating system; and
a BIOS module operated by the processor, wherein the BIOS module is configured to
receive a user selection of either the secondary operating system or the primary operating system;
determine, when the selection indicates the secondary operating system, whether the primary operating system is running or hibernating and to determine, when the selection indicates the primary operating system, whether the secondary operating system is running or hibernating; and
conditionally load, responsive to the user selection, either the secondary operating system if the primary operating system is not running or hibernating, or the primary operating system if the secondary operating system is not running or hibernating.

26. The system of claim 25 wherein the secondary operating system is write protected and isolated from the primary operating system.

27. The computer system of claim 25 wherein the BIOS is further configured to set a first operating clock rate for the processor responsive to the user selection of the secondary operating system and to set a second operating clock rate for the processor responsive to the user selection of the primary operating system, wherein the second clock rate is faster than the first clock rate.

28. The computer system of claim 25 wherein the BIOS is further configured to activate, responsive to the user selection of the secondary operating system, a first set of the computer system's hardware components, and activate a second set of the computer system's hardware components responsive to the user selection of the primary operating system, wherein the first and second sets differ by at least one hardware component.

29. The computer system of claim 25 wherein the BIOS is further configured to activate a subset of available memory of the computer system responsive to the user selection of the secondary operating system.

30. The computer system of claim 25 wherein the BIOS is further configured to activate only a fraction of a display area in a display screen of the computer system responsive to the user selection of the secondary operating system.

* * * * *